Jan. 20, 1970  F. KESSELRING  3,491,315
SOLENOID COIL DRIVE FOR SYNCHRONOUS CIRCUIT BREAKERS
USING SHORT CIRCUITED WINDING PORTION
Filed July 3, 1968  3 Sheets-Sheet 1
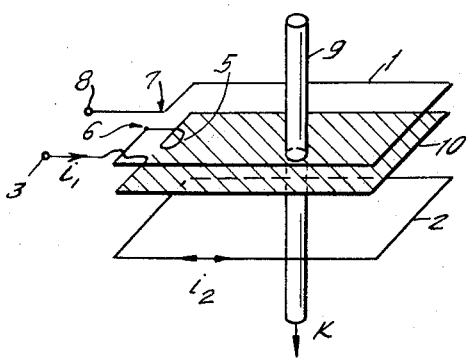
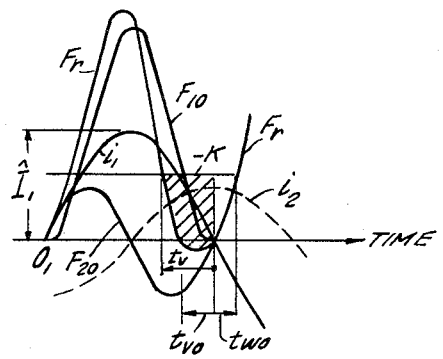
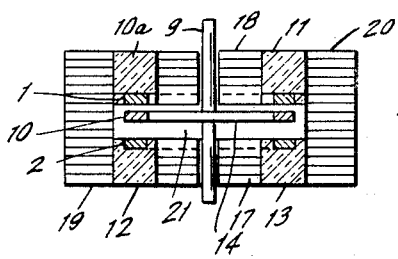
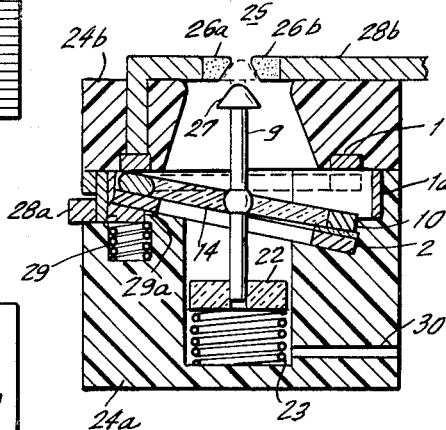
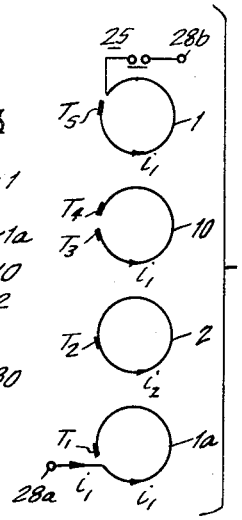
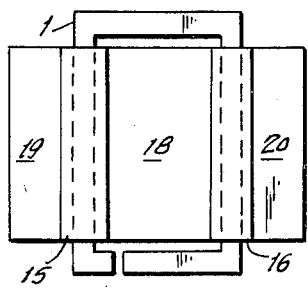
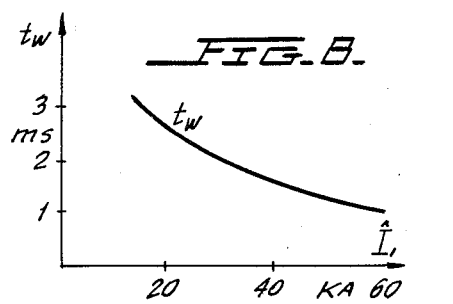
INVENTOR.
FRITZ KESSELRING
BY
OSTROLENK, FABER, GERB & SOFFEN
ATTORNEYS

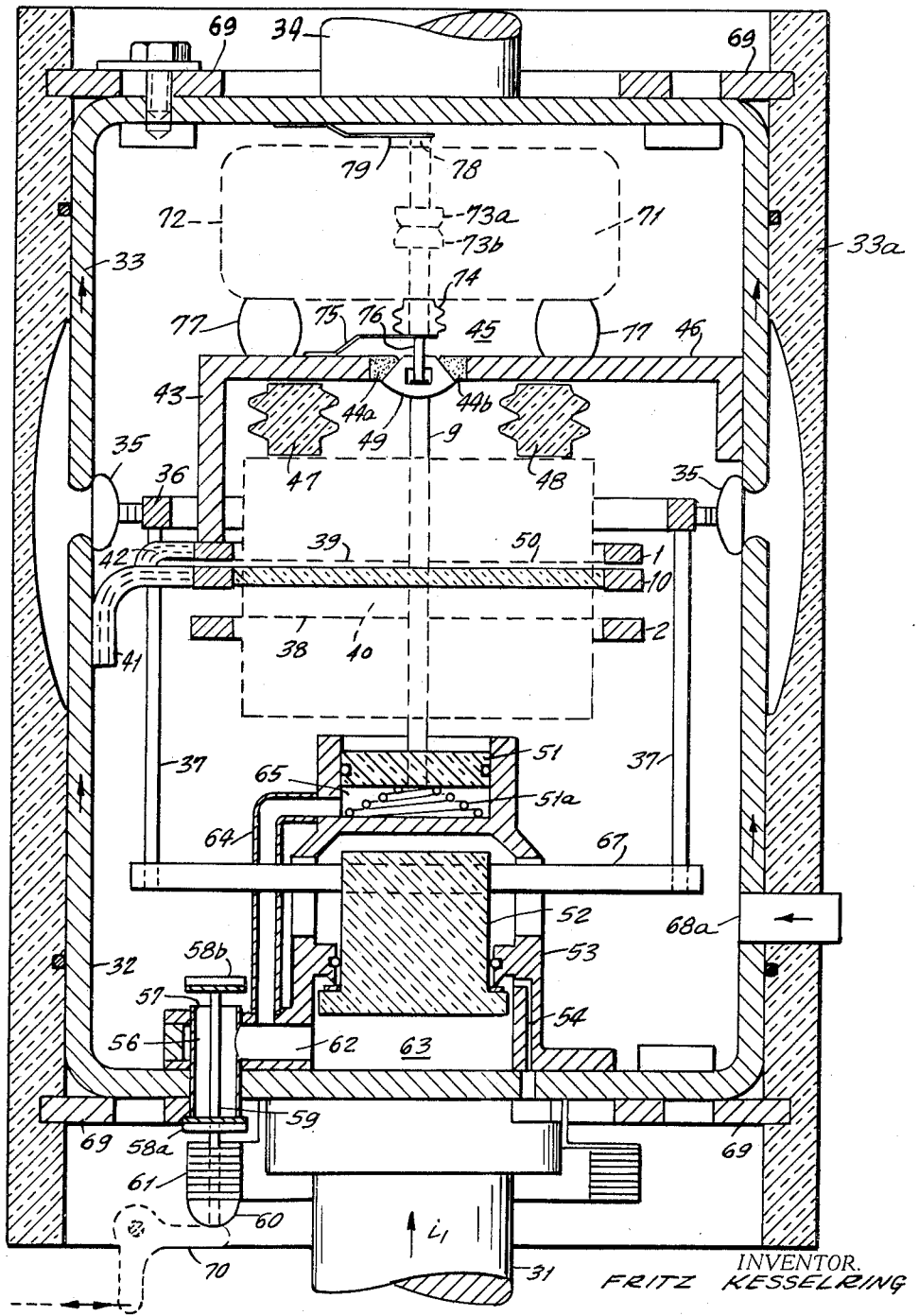

United States Patent Office 3,491,315
Patented Jan. 20, 1970

3,491,315
SOLENOID COIL DRIVE FOR SYNCHRONOUS CIRCUIT BREAKERS USING SHORT CIRCUITED WINDING PORTION
Fritz Kesselring, Kusnacht, Zurich, Switzerland, assignor to Siemens Aktiengesellschaft, a corporation of Germany
Filed July 3, 1968, Ser. No. 742,349
Claims priority, application Germany, July 7, 1967, 1,665,988
Int. Cl. H01h 83/18
U.S. Cl. 335—19　　　　　　　　　　　　　11 Claims

ABSTRACT OF THE DISCLOSURE

A solenoid coil drive for a synchronous circuit breaker in which a movable contact is connected to a movable winding portion of a solenoid winding. Current through the contact flows in series with the movable and stationary portions of the solenoid winding to create a force tending to contract the winding and to move the movable contact to an open position. The movable contact is biased closed by a biasing spring or pneumatic bias which opposes the solenoid current. A short-circuited turn magnetically coupled to the solenoid winding causes a phase shift in the solenoid force tending to open the contact such that the solenoid force exceeds the spring biasing force to open the contact at a fixed time prior to zero instantaneous current through the movable contact.

This application describes an improvement of the device shown in application Ser. No. 707,659, filed Feb. 23, 1968, in the names of Kesselring and Aumayer and assigned to the assignee of the instant invention.

BACKGROUND OF INVENTION

This invention relates to synchronous circuit breakers, and more particularly relates to a synchronous circuit breaker using a solenoid winding having a movable portion for driving the movable contact and a short-circuited winding portion for phase shifting the solenoid operating force such that the circuit breaker contacts will be opened within a fixed time prior to a current zero, and will reclose the contacts if current continues to flow after current zero.

It is well known that a circuit is most efficiently interrupted if the contacts can be opened just prior to a current zero. Thus, any arc which is drawn will be extinguished when the current passes through zero with the contacts being sufficiently separated to prevent restrike of the arc in the next half cycle. In the synchronous circuit breaker, if the desired zero current interruption is unsuccessful, the contacts are immediately reclosed responsive to continued current flow after current zero, and the process is repeated prior to the next current zero.

Many circuits, including those having solenoid drives, have been devised to anticipate a current zero value and to operate the contacts prior to current zero. These circuits have been quite complex and, in some cases unreliable, especially under high current conditions and various asymmetric current conditions.

The present invention is for a novel, simple and reliable solenoid operating circuit for operating circuit breaker contacts just prior to a current zero value and for automatically reclosing the contacts in the event of unsuccessful interruption which is unaffected by the particular current magnitudes and symmetry of the current to be interrupted.

Accordingly, a primary object of this invention is to provide a novel solenoid drive circuit for a synchronous circuit breaker which is simple and reliable and is unaffected by the current magnitude and symmetry of the current to be interrupted.

Another object of this invention is to provide a novel solenoid drive circuit for synchronous circuit breakers which has a short-circuited winding portion to insure contact operation within a given time prior to a current zero.

These and other objects of this invention will become apparent from the following description when taken in connection with the drawings in which:

FIGURE 1 schematically shows the solenoid winding configuration in accordance with the invention.

FIGURE 2 schematically illustrates the various currents and forces generated thereby in the circuit of FIGURE 1 as a function of time.

FIGURE 3 is a cross-sectional view of the solenoid configuration of FIGURE 1 which incorporates a magnetic structure.

FIGURE 4 is a top view of FIGURE 3.

FIGURE 5 is a cross-sectional view of a first embodiment of the invention which illustrates the manner in which the solenoid coil configuration drives the bridging movable contact of a circuit interrupter.

FIGURE 6 schematically illustrates the electrical winding configuration of FIGURE 5.

FIGURE 7 illustrates the prerelease time as a function of current for the device of FIGURE 5.

FIGURE 8 illustrates reclosing time as a function of current for the arrangement of FIGURE 5.

FIGURE 9 shows a cross-sectional view of the application of the solenoid drive mechanism of the present invention in combination with a vacuum interrupter.

Figure 10:
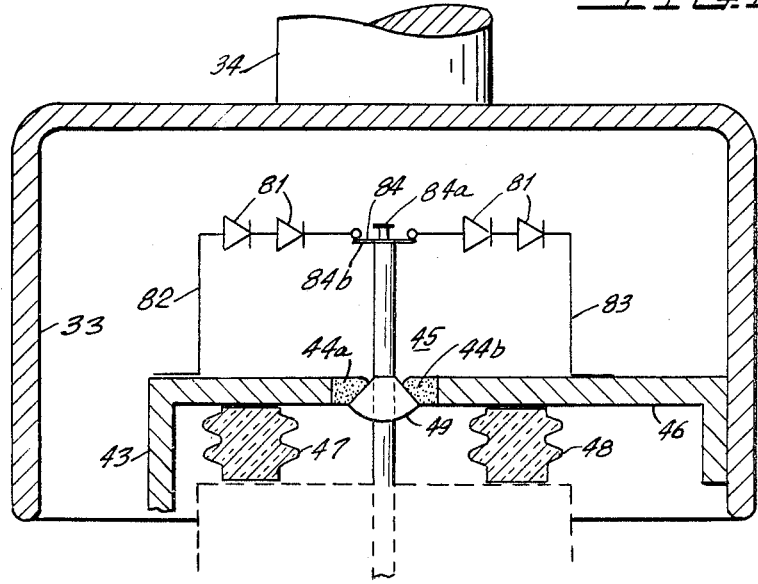

FIGURE 10 illustrates the application of the solenoid drive system of the present invention in combination with semi-conductor devices in parallel with the contacts.

Figure 11:
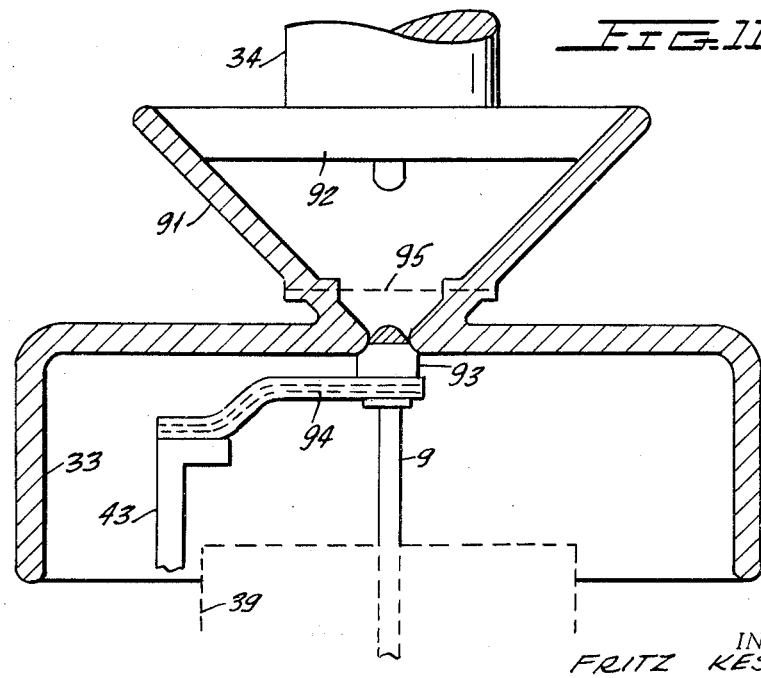

FIGURE 11 illustrates the manner in which the invention can be applied to a compressed gas-type interrupter.

Referring now to FIGURE 1, there is schematically shown a solenoid drive structure consisting of a rectangular, moving coil portion 10 and a fixed, rectangular coil portion 1, where coils 10 and 1 are continuous turns of a common solenoid. A short-circuited turn 2 is then provided which is magnetically coupled to coils 1 and 10, with the coil 2 being stationary. The current $i_1$, which is to be disconnected by the circuit breaker, is supplied to coil 10 from terminal 3 through a suitable, flexible conductor. The end 4 of coil 10 is then connected, by means of flexible conductor 5 to end portion 6 of stationary coil portion 1. The opposite end 7 of coil poriton 1 is then connected to terminal 8.

The movable coil 10 may have the interior thereof filled with a suitable insulation support, schematically illustrated in FIGURE 1 by the shading lines, with this insulation support being firmly connected to contact operating rod 9. Contact rod 9, as will be seen more fully hereinafter, is connected to the movable contact of a pair of cooperating contacts which are connected in series with terminals 3 and 8 and carry the current $i_1$. A suitable biasing force K is then connected to rod 9 and biases rod 9 downwardly and in the direction shown by the arrow in FIGURE 1. This biasing force may be supplied by a spring or by a suitable pneumatic means, as will be more fully described.

The current $i_1$ flowing through windings 10 and 1 is schematically illustrated in FIGURE 2 as a function of time, along with a force of attraction $F_{10}$ which is the force of attraction between coils 1 and 10 by virtue of the current $i_1$ flowing through the two coils in the same direction. The force $F_{10}$ is, of course, proportional to the square of the current $i_1$.

The magnetic flux created by the flow of current $i_1$ in coils 1 and 10 induces a voltage in short-circuited winding 2, giving rise to a current $i_2$, shown in FIGURES 1 and 2. By suitably dimensioning coil 2, whereby its ohmic resistance is at least three times greater than its inductive impedance, the current $i_2$ will have a phase shift of about 90° with respect to the current $i_1$, as shown in FIGURE 2.

The force then produced between the fixed coil 2 and the moving coil 10 is proportional to the product of $i_1$ and $i_2$, this force being shown in FIGURE 2 as the force $F_{20}$, where the force $F_{20}$ has a frequency which is twice the frequency of the current $i_1$.

Thus, there are three forces acting upon the movable coil 10, these being the biasing force K, shown in FIGURE 2 as the constant force −K, the force $F_{10}$, and the force $F_{20}$. During the initial part of the cycle shown in FIGURE 2, forces $F_{10}$ and $F_{20}$ are in the same direction, with their resultant force shown as the force $F_r$. In the middle of the half cycle, however, the force $F_{20}$ reverses and eventually is in opposition to the force $F_{10}$ and is additive with the constant biasing force K. At a time $t_v$ prior to the current zero of the current $i_1$, it will be seen that forces $F_{20}$ plus the constant force K are equal to the opposing force $F_{10}$, so that the net force on coil 10 will be zero. Thereafter, a net opening force will be applied to coil 10 throughout the shaded area in FIGURE 2 which represents the driving energy available to move coil 10 and thus rod 9 to a contact disengaged position.

After passage of the current $i_1$, through zero and presuming that the current continues to flow, the resultant force $F_r$ is seen to increase approximately linearly until, after a time $t_{w0}$, the resultant force exceeds the value required to cause reclosing of the contacts by virtue of the repositioning of movable coil 10 to its closed position.

It should be particularly noted from FIGURE 2 that the prerelease time $t_z$ will always be greater than some minimum prerelease time $t_{v0}$, regardless of the magnitude of current $i_1$. It is this novel feature which contributes to a great extent to the reliability of the solenoid drive system of the invention. Moreover, it will be seen that the time $t_{w0}$ after the passage of current zero until a reclosing force is reached is very short so that extremely effective reclosing is achieved in the event of a failure to interrupt the circuit at the current zero value.

Winding 2 of FIGURE 1 it coupled to windings 1 and 10 by air. In order to obtain greater forces, it is possible to provide a suitable magnet system, as shown in FIGURES 3 and 4 for improving the coupling between the various windings.

FIGURE 3 shows the winding 1 as being carried by insulators 10a and 11, while the short-circuited winding 2 is carried by insulators 12 and 13. Movable winding 10 is then wound on an insulation support form 14 which carries the operating rod 9. Two internal core portions 17 and 18, formed of respective stacks of magnetic laminations, are then supported within the insulators 12–13 and 10a–11, respectively, to define an internal core portion having air gap 21 within which the movable winding 10 can move. External core portions 19 and 20, which are also formed of stacked lamination sheets, are then secured to the outside of the various respective insulators 10a, 11, 12 and 13.

The magnetic structure including its air gap 21 is suitably dimensioned such that no noticeable saturation will take place within the prerelease time $t_v$ and reconnecting time which follows the current zero and includes time $t_{w0}$ under the highest current $i_1$ which can be expected. Note that it is possible to operate the novel system in the absence of the additional magnetic structure as by increasing the number of turns, for example, in the stationary winding portion 1 of the solenoid.

FIGURES 5 and 6 show a typical embodiment of the invention in which the solenoid drive system is provided in the absence of a magnetic structure. Referring to FIGURES 5 and 6, and since saturation phenomena need not be considered, the windings shown as windings 1, 10 and 2 correspoding to the same windings in FIGURE 1, have a circular configuration. Note in FIGURE 5 that winding 10 is angularly movable from a disengaged position, shown in solid lines to a dotted line engaged position.

FIGURE 5 also shows a second fixed coil portion 1a which is electrically connected in series with coil portions 10 and 1. The circuit configuration for the various coils will be described hereinafter in connection with FIGURE 6.

Referring first, however, to FIGURE 5, it is seen that the movable coil 10 secured to its insulation disc 14 is suitably pivotally connected to a central portion of operating rod 9. The bottom of operating rod 9 is suitably secured to a piston 22 which receives a biasing spring 23 at the bottom thereof, which biases rod 9 upwardly. Piston 22 moves within a cylindrical cavity within the lower cylindrical insulation support member 24a which also receives winding portions 1a and 2. An upper cylindrical insulation support body 24b then carries the coil 1, with the two insulation members 24a and 24b being suitably secured together in any desired manner.

An interrupter contact 25 is then formed of fixed contacts 26a and 26b which cooperate with the movable bridging contact 27 which is carried on the top of rod 9. A first terminal is then formed of conductive member 28a which is electrically connected to fixed contact 26a in a manner to be later described. The second terminal of the switch is formed of terminal 28b which is electrically connected to contact 26b. The left-hand side of coil 2 of FIGURE 5 is rotatably supported atop a wedge-shaped member 29a which is biased upwardly by the biasing spring 29. This, in turn, presses the left-hand end of coil 2 against the left-hand end of coil 10 to press the left-hand end of coil 10 against the left-hand end of coil 1.

A compressed gas connection 30 is then formed in body 24a and communicates with the volume beneath piston 22. A suitable compressed gas source is connected to conduit 30, thereby to provide a biasing force which biases rod 9 upwardly and serves the purpose of the biasing force K in FIGURES 1 and 2.

The circuit connection between the various coils in FIGURE 5 is schematically illustrated in FIGURE 6. Thus, progressing from the bottom of FIGURE 6 and the terminal 28a, it is seen that an electrical circuit is formed through coil portion 1a to the terminal $T_1$. Terminal $T_1$ of coil 1a is in turn electrically connected to region $T_2$ of short-circuited coil 2. Portion $T_2$ of coil 2 is then connected to terminal portion $T_3$ of coil 10, while terminal $T_4$ of coil 10 is pressed against terminal $T_5$ of coil 1. The opposite end of coil 1 is then connected to the switch 25 and terminal 28b, as shown.

Thus, the current $i_1$ in FIGURE 6 will flow in series through coils 1a, 10 and 1 in the desired manner, thereby to induce the current $i_2$ in the coil 2.

As pointed out previously, the additional turn provided by the coil 1a permits the generation of sufficiently high force so that a magnetic system of the type shown in FIGURES 3 and 4 need not be used.

The operation of the device of FIGURE 5 is as follows:

It should be first understood that the entire assembly may be contained within a relatively high-pressure chamber filled with a gas such as air or sulfur hexafluoride. This high pressure normally is applied to the top of piston 22. Alternatively, an auxiliary channel through ths insulation body 24a and leading to the top of piston 22 may be used to apply the high-pressure to the top of piston 22.

In the open position shown in FIGURE 5, the high-pressure applied to the top of piston 22 biases piston 22 downwardly against the biasing force of spring 23. At this time, channel 30, through a suitable valving system, is vented to the ambient pressure. Therefore, piston 22 will be held in the position shown, with contact 27 separated from contacts 26a and 26b. In order to close the contacts, high-pressure is applied to conduit 30 and to the bottom of piston 20 which may be equal to the pressure on top of piston 22. Therefore, spring 23 will move rod 9 and contact 27 to the closed position, as shown in dotted lines. At the same time, insulation disc 14 and movable winding 10 will move to the dotted line position indicated by virtue of the pivotal connection between insulation plate 14 and rod 9.

In order to now open the contacts either manually or in response to fault current conditions, the pressure in conduit 30 is again reduced to atmospheric pressure so that a downward biasing force is applied to rod 9 which is equal to the difference in the pressure atop piston 22 less the upward force due to spring 23. This resultant biasing force is the force K shown in FIGURES 1 and 2. This force, which tends to open the contacts, is counterbalanced by the forces $F_{10}$ and $F_{20}$ of FIGURE 2 caused by the action of windings 1, 1a and 2 upon the movable winding 10. Their resultant force $F_r$ shown in FIGURE 2 will decrease below the downward biasing force due to the pressure atop piston 22 opposed by spring 23 at some point within the time $t_v$ of FIGURE 2, whereupon the rod 9 will move downwardly with movable coil 10 to open the contact 25.

In the event of an unsuccessful interruption and continued current flow through an arc drawn between contacts 26a, 27 and 26b, the electrodynamic forces on movable winding 10 will quickly increase, as shown in FIGURE 2, until they are greater than the downward biasing force on rod 9 so that the contacts are immediately reclosed shortly after the time $t_{w0}$, shown in FIGURE 2.

Devices constructed in the manner shown in FIGURE 5 have been found to be capable of disconnecting a maximum symmetric current of 55,000 amperes and a maximum shifted current of 90,000 amperes, with the tripping characteristics following the curve illustrated in FIGURE 7. In this device, the minimum pre-trip time $t_{v0}$ was 1.3 milliseconds. The solid curve of FIGURE 7 applies to symmetric half waves, while the dash curve applies to maximum shifted half waves and with the dot-dash curve corresponding to short half waves.

FIGURE 8 shows the time taken for the contacts to reclose after the current zero has been passed in the event of an unsuccessful interruption as time $t_w$ plotted against the current being interrupted. Note that this time is extremely short and of the order of only 3 milliseconds for currents of about 15,000 amperes. It can be shown that the amount of work needed to cause both contact opening and the reclosing of the contact are about equal and have a value of about 2,500 watt-seconds. This work is extremely small for this type application, and is unusually small when considering the almost ideal characteristics which are obtained for the device, as shown in FIGURES 7 and 8.

FIGURE 9 illustrates the manner in which the novel solenoid drive system of the invention may be applied to a synchronous vacuum switch. Referring to FIGURE 9, the vacuum switch has a lower terminal 31 which is electrically connected with a lower bell-shaped fixed main contact 32. An upper bell-shaped fixed main contact 33 is insulated from contact 32 and receives an upper terminal 34. A suitable insulation container 33a supports members 32 and 33 with respect to one another.

Movable contact segments 35 are then arranged along the interior surface of contacts 32 and 33 and are supported from a ring 36 by suitable biasing springs which bias contacts 35 radially outwardly and into contact with the contacts 32 and 33.

A plurality of actuating rods 37 are then fastened to ring 36 and extend downwardly to be connected to a suitable driving mechanism which is to be described hereinafter.

The solenoid drive system used in the arrangement of FIGURE 9 incorporates a magnetic structure of the type described in FIGURES 3 and 4 where dotted blocks 38 and 39 repesent the inner magnetic cores similar to cores 17 and 18 of FIGURE 3. These cores are separated from one another by the air gap 40 corresponding to air gap 21 of FIGURE 3 which receive the movable solenoid winding portion 10. The fixed solenoid winding portion 1 is then suitably supported in a manner (not shown) above winding portion 10 and is suitably electrically connected in series with winding portion 10, while the short-circuited winding 2 is similarly suitably supported below winding 10. A flexible conductor 41 is then electrically connected from contact member 32 to the start of coil 10. A second flexible conductor 42 is then provided to connect the opposite end of movable coil 10 (not shown) to the start of fixed winding portion 1. A conductor 43 is then connected to the end of winding 1 and extends to the fixed contact 44a of the bridging contact switch 45. The other contact 44b of switch 45 is then connected to the upper main contact 33 by conductor 46. Both conductors 43 and 46 are supported from the internal magnet structure of the solenoid drive system by the support insulators 47 and 48, respectively.

The drive rod 9 of the solenoid drive system is then connected to the bridging contact 49 which cooperates with contacts 44a and 44b and is further connected at a central portion thereof to the insulation panel 50 which carries movable winding 10. The bottom of rod 9 is then fastened to a piston 51. A differential piston 52 which is carried in housing 53 controls the application of various control pressures to the operating system.

Support 53 contains a narrow conduit 54 which vents the volume 55 to regions external of the switch interior. A valve system 56 is then provided which has a housing 57 and valve plates 58a and 58b which are both directly secured to rod 59. A suitable magnetic system 61 having an armature 60 for magnetically operating valve 56 surrounds terminal 31 and is energized by the flow of current $i_1$ which is the current to be interrupted by the circuit breaker.

A channel 62 which is controlled by valve 56 then leads to the volume 63 beneath differential piston 52 and to the volume 65 below piston 51 by means of the tube 64.

Actuating rods 37 are then secured to a cross-support 67 which is, in turn, secured to the differential piston 52. It is to be noted that the insulation cylinder 33a is connected to the main contacts 32 and 33 by the displaceable stops 69. An actuating lever 70 which is located externally of the interior of the switch is also provided for the manual operation of the armature 60 by means of a suitable rotation of the lever 70.

A standard vacuum switch 71 is then disposed above conductors 43 and 46 and consists of a suitable insulation vessel 72 which contains a fixed contact 73a, a moving contact 73b, and a metallic bellows 74 which contains suitable operating linkages for operating the contacts 73a and 73b from externally of the vessel 72. The lower end of bellows 74 is electrically connected to conductor 43 through the conductive leaf-spring 75 and is mechanically connected by the insulation rod portion 76 to a lost-motion slot within movable contact 49. Suitable insulation supports 77 are provided for supporting the vacuum switch 71 atop conductors 43 and 46. The upper terminal 78 of the vacuum switch is electrically connected to the main contact 33 through the conductive leaf-spring 78 in the manner illustrated.

It will be seen that the contact arrangement in the device of FIGURE 9 consists of three parallel connected contact groups. The first contact group consists of contacts 35 which are designed to normally carry the rated current of the device and make good electrical contact between the contact members 32 and 33. The second contact system consists of the vacuum switch 71 connected in parallel with contacts 35. The third contact system consists of the contact 45 which is capable of producing synchronous interruption.

The order in which these various contacts are operated when the circuit breaker is being opened consists of initially opening contacts 35, thereafter opening contacts 45, and finally opening vacuum switch 71. The contacts are closed with contacts 45 first closing, vacuum switch 71 next closing and contacts 35 closing last.

The detailed operation of the device of FIGURE 9 is as follows:

With all contacts closed and in the position shown in FIGURE 9, the current $i_1$ flows from the lower terminal 31 through the bell-shaped main contact 32, contact segments 35 and the upper bell-shaped contact 33 to the terminal 34. The volume within the conductive bell-shaped contacts 32 and 33 is free of any magnetic field so that there are no eddy current effects or magnetization effects existing within the volume. In order to open the circuit breaker, actuating lever 70 is rotated in a clockwise direction, either manually or in response to some predetermined fault condition. As soon as the current $i_1$ passes through a zero current value, the armature 60 of the magnetic system 61 drops out so that rod 59 moves down to open valve 58a and close valve 58b. Compressed gas which fills the interior of the chamber formed by housing 33a and which is admitted to this volume through conduit 68a is then relieved from volume 63 through the opened valve plate 58a. Similarly, the compressed gas within volume 65 is released through conduit 64 and open valve plate 58a. This then permits the pressure on top of piston 51 less the biasing force of spring 51a to appply a downward bias to rod 9, thereby defining the force K described in FIGURES 1 and 2. Note that the proper selection of the cross-section of tube 64 determines the rate of increase of this force K. At the same time and with the release of pressure in volume 63, differential piston 52 moves downward, thereby moving support 67 and actuating rods 37 downwardly in order to move switching segments 35 downwardly to open the contact between members 32 and 33 formed by contacts 35.

The current through contact segments 35 is now commutated to the coil system including windings 10 and 1, and the solenoid drive system will now operate in the manner described previously, whereby contact 9 will be moved downwardly to open contacts 45 shortly prior to a current zero value.

With the opening of contacts 45 and as rod 9 continues downwardly, any current flowing through the circuit will commutate through the closed contacts 73a and 73b of vacuum switch 71, with these contacts being opened immediately after the opening of contact 49 to bring about final interruption of the current $i_1$. If, for any reason, the arc between the contacts 73a and 73b of vacuum switch 71 is not extinguished, movable coil 10, in a manner described previously in connection with FIGURES 1 and 2, will be reclosed at high speed, whereby contacts 45 are immediately reclosed and the vacuum switch contacts 71 are subsequently closed without any current or voltage duty on these contacts during this reclosing operation.

The contacts 45 will then be reopened at the next current zero, and the procedure described above is repeated until a final synchronous disconnection takes place.

In order to reclose the device of FIGURE 9 after a complete opening, the operating lever 70 is rotated counterclockwise, thereby moving armature 60 against its magnet system 61 and moving the valve plates 58a and 58b to the positions shown in the drawing. Pistons 51 and 52 will then move upwardly in order to close contacts 35 and 45, with the vacuum switch 71 closing last.

When using the novel invention in combination with the vacuum switch 71 in FIGURE 9, the duty on the vacuum switch 71 will be extremely small and the vacuum switch need be designed only for very low current carrying capacity. That is to say, the vacuum switch 71 need be designed to carry currents for only from 8 to 12 milliseconds, or to carry a large and rapidly decreasing current for about 1 millisecond.

FIGURE 10 shows a further embodiment of the invention similar to the device described in FIGURE 9, except that the vacuum switch 71 is replaced by four series connected silicon diodes 81 connected to conductors 43 and 46 by conductors 82 and 83, respectively. The diodes are then arranged in series with a cut-out switch 84 which is carried on an extension of rod 9. In all other regards the device of FIGURE 10 is identical to that of FIGURE 9, and similar identifying numerals are used to identify similar components.

In the embodiment of FIGURE 10 and after the opening of switch 45, the decreasing current $i_1$ will commutate through diodes 81 and cut-out switch 84. Note that switch 84 is a delayed opening switch and is not opened until projection 84a of the operating rod extension of operating rod 9 reaches the main switch body 84b.

Since contact 49 is opened at some given pre-release time prior to current zero, the free travel permitted in cut-out switch 84 will be opened in the vicinity of the current zero value. Thereafter, the diodes 81 block any reverse current attempting to flow between conductors 43 and 46 so that the switch 84 will open without any current flow therethrough.

In the event that commutation of current through the diodes 81 prior to interruption fails because the bridging switch 45 opens at the wrong polarity, the bridging switch 45 will close in the manner previously described and the switch will open shortly before the passage of the current through the next current zero value. Thus, the diodes 81 would have conducted a current for only a very short period of time.

It has been found that silicon diodes having a rated current of 600 amperes may be used in the system of FIGURE 10 for interruption of short-circuit currents of up to 100,000 amperes.

FIGURE 11 shows a further modification of the device of FIGURE 9 wherein the vacuum switch 71 is replaced by a compressed gas switching arrangement. Thus, in FIGURE 11, the upper bell-shaped contact 33 is modified to contain a nozzle-shaped contact 91 in the center thereof which is connected to terminal 34 through a suitable spider-type arrangement 92. A movable contact 93 is then connected to an extension of operating rod 9, and is electrically connected to conductor 43 by means of the flexible conductor 94. A suitable slide valve, schematically illustrated by dotted line 95, is provided which shuts off the gas blast after disconnection of contact 93 from terminal 33.

In operation, the device of FIGURE 11 will operate as previously described in connection with the device of FIGURES 9 and 10 in regard to the operation of contacts 35 and 45. In FIGURE 11, however, and after opening of contact 45, movable contact 93 is pulled downward by rod 9 and the arc produced between contact 93 and contact 33 is extinguished by blowing the arc into nozzle 91, with the arc being extinguished during the passage of the current through zero. Should this not occur, contacts 45 will be immediately reconnected with a synchronous disconnecting operation taking place during the next passage of the current through zero.

Although this invention has been described with respect to particular embodiments, it should be understood that many variations and modifications will now be obvious to those skilled in the art, and, therefore, the scope of this invention is limited not by the specific disclosure herein, but only by the appended claims.

The embodiments of the invention in which an exclusive privilege or property is claimed are defined as follows:

1. A solenoid drive system for moving an operating member from a first position to a second position prior to a given instantaneous current value in an electrical circuit; said drive system comprising a solenoid winding having a fixed winding portion and a movable winding portion coaxial therewith and disposed in spaced, generally parallel planes; and a short-circuited winding coaxial with said solenoid winding and disposed in a plane generally parallel to and adjacent the plane of said movable winding portion; support means for supporting said fixed winding portion and said short-circuited winding; means connecting said operating member to said movable winding portion; and terminal means connected to the ends of said solenoid winding for connecting said solenoid winding in series with said electrical circuit; said fixed winding portion and said movable winding portion wound in the same direction whereby a current through said solenoid winding creates a force for moving said movable winding portion toward said fixed winding portion; the net force on said movable winding portion being modified by current flow induced in said short-circuited winding.

2. The system as set forth in claim 1 which includes biasing means connected to said movable winding portion for biasing said movable winding portion away from said fixed winding portion; biasing force having a value equal to the force on said movable winding due to both current flow in said solenoid winding and induced current flow in said short-circuited winding at a time shortly prior to a current zero value in the current flow through said solenoid winding.

3. The system of claim 2 which includes a cooperating fixed contact and movable contact connected in series with said electrical circuit; said operating member connected to said movable contact and moving said movable contact to a disengaged position responsive to movement of said movable winding portion away from said fixed winding portion.

4. The system of claim 2 which includes a magnetic ion circuit magnetically coupling said movable and fixed solenoid winding portions and said short-circuited winding.

5. The system of claim 2 wherein said movable and fixed solenoid winding portions and said short-circuited winding consist respectively of single turns of conductive material.

6. The system of claim 2 wherein said fixed solenoid winding portion consists of two turns of conductive material and wherein said movable winding portion and short-circuited winding consist of respective single turns of conductive material; said solenoid winding portions and said short-circuited winding being magnetically coupled in air.

7. The system of claim 2 wherein said movable winding portion is pivotally movable around one edge portion thereof.

8. In a synchronous circuit breaker for protection of an electrical circuit; the parallel connected combination of a pair of cooperating synchronous switch contacts, a pair of cooperating main contacts and a pair of auxiliary contacts, and respective operating means for said each of said pairs of contacts; said operating means for said synchronous switch contacts comprising;

(a) a solenoid winding having a fixed winding portion and a movable winding portion coaxial therewith and disposed in spaced, generally parallel planes; and a short circuited winding coaxial with said solenoid winding and disposed in a plane generally parallel to and adjacent the plane of said movable winding portion; support means for supporting said fixed winding portion and said short-circuited winding; means connecting said operating member to said movable winding portion; and terminal means connected to the ends of said solenoid winding for connecting said solenoid winding in series with said electrical circuit; said fixed winding portion and said movable winding portion wound in the same direction whereby a current through said solenoid winding creates a force for moving said movable winding portion toward said fixed winding portion; the net force on said movable winding portion being modified by current flow induced in said short-circuited winding; biasing means connected to said movable winding portion for biasing said movable winding portion away from said fixed winding portion; biasing force having a value equal to the force on said movable winding due to both current flow in said solenoid winding and induced current flow in said short-circuited winding at a time shortly prior to a current zero value in the current flow through said solenoid winding; said operating means connected to said pair of synchronous switch contacts and moving said synchronous switch contacts to a disengaged position;

(b) said operating means for said disconnect contacts opening said disconnect contacts prior to the opening of said synchronous switch contacts;

(c) said operating means for said pair of auxiliary contacts including a lost-motion connection means connected to said operating means of said synchronous switch contacts for opening said auxiliary contacts immediately following the opening of said synchronous switch contacts.

9. The circuit breaker of claim 8 wherein said pair of auxiliary contacts comprise a vacuum switch.

10. The circuit breaker of claim 8 wherein said pair of auxiliary contacts comprise a gas blast switch.

11. The circuit breaker of claim 8 which includes diode means connected in series with said auxiliary switch.

References Cited

UNITED STATES PATENTS

| | | | |
|---|---|---|---|
| 1,753,256 | 4/1930 | Thorp | 335—266 |
| 3,364,326 | 1/1968 | Leeds | 335—19 |
| 3,379,850 | 4/1968 | Azinger. | |

BERNARD A. GILHEANY, Primary Examiner

H. BROOME, Assistant Examiner

U.S. Cl. X.R.

200—148